United States Patent
Morman et al.

(10) Patent No.: US 12,393,311 B1
(45) Date of Patent: Aug. 19, 2025

(54) METHOD FOR IDENTIFYING A USER INTERFACE CONTROL PANEL IN A DOMESTIC APPLIANCE

(71) Applicant: Haier US Appliance Solutions, Inc., Wilmington, DE (US)

(72) Inventors: Brian J. Morman, Ballwin, MO (US); Michelle Diana Gross Berry, Louisville, KY (US); Kyle James Brewer, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 18/781,434

(22) Filed: Jul. 23, 2024

(51) Int. Cl.
| | |
|---|---|
| *G06F 3/044* | (2006.01) |
| *A47L 15/42* | (2006.01) |
| *G06F 9/451* | (2018.01) |
| *G06K 7/14* | (2006.01) |
| *G06V 20/60* | (2022.01) |

(52) U.S. Cl.
CPC .......... *G06F 3/044* (2013.01); *A47L 15/4293* (2013.01); *G06F 9/451* (2018.02); *G06K 7/1413* (2013.01); *G06V 20/60* (2022.01); *A47L 2301/08* (2013.01)

(58) Field of Classification Search
CPC ....... G06F 3/044; G06F 9/451; G06K 7/1413; G06V 20/60; A47L 15/4293; A47L 2301/08
See application file for complete search history.

(56) References Cited

U.S. PATENT DOCUMENTS

| | | | |
|---|---|---|---|
| 6,648,981 B2 | 11/2003 | McIntyre et al. | |
| 7,296,236 B2 | 11/2007 | King | |
| 8,890,824 B2 | 11/2014 | Guard | |
| 9,218,561 B2 | 12/2015 | Yilmaz | |
| 10,945,582 B1 | 3/2021 | Morman et al. | |
| 11,163,405 B2 | 11/2021 | Hartmann et al. | |
| 2007/0157642 A1* | 7/2007 | Ferragut, II | F25D 29/00 62/139 |
| 2010/0217441 A1* | 8/2010 | Eichman | G05B 19/0426 62/157 |
| 2020/0019260 A1* | 1/2020 | Woodham, Jr. | H05K 1/181 |
| 2021/0241244 A1* | 8/2021 | Lee | G07F 17/266 |

(Continued)

FOREIGN PATENT DOCUMENTS

| | | |
|---|---|---|
| CN | 202548813 U | 11/2012 |
| CN | 110929754 A | 3/2020 |

(Continued)

*Primary Examiner* — Hong Zhou
(74) *Attorney, Agent, or Firm* — Dority & Manning, P.A.

(57) ABSTRACT

A user interface assembly for a domestic appliance includes a control panel; a user interface board; a digital image sensor attached to the user interface board, the digital image sensor being configured to optically view the control panel; and a controller operably coupled with the digital image sensor, the controller being configured to perform an operation. The operation may include directing the digital image sensor to scan at least a portion of the second panel side to capture a digital signal; analyzing the received digital signal to determine a model identification of the control panel; and activating a predetermined operating software for the domestic appliance based on the determined model identification.

20 Claims, 3 Drawing Sheets

(56) References Cited

U.S. PATENT DOCUMENTS

2023/0346192 A1* 11/2023 Uyeda ................ A47L 15/0063
2024/0288949 A1*  8/2024 Hoover ................ G06F 1/1628

FOREIGN PATENT DOCUMENTS

| CN | 113050471 A | 6/2021 |
| CN | 114037096 A | 2/2022 |
| CN | 219143303 U | 6/2023 |
| WO | WO2013026734 A1 | 2/2013 |

* cited by examiner

METHOD FOR IDENTIFYING A USER INTERFACE CONTROL PANEL IN A DOMESTIC APPLIANCE

FIELD OF THE INVENTION

The present subject matter relates generally to domestic appliances, and more particularly to initializing user interface software for domestic appliances.

BACKGROUND OF THE INVENTION

Certain domestic appliances may include a variety of controls configured to receive inputs for performing certain operations within the appliance. According to one example, a laundry treatment appliance such as a washing machine appliance may include a touch interface including a variety of touch inputs. For instance, capacitive touch sensing types of controls that rely on sensitivity to a user's touch may be included on a fascia of the appliance. These controls may be provided as part of a user interface assembly for controlling various operations of the appliance.

In some instances, a single universal user interface board may be configured with multiple different "personalities" such that select inputs (e.g., buttons) are activated corresponding to a particular appliance, model, etc. During assembly, the correct "personality" is initiated to ensure that the correct operations are present and active according to the appliance. However, existing methods for initializing the "personality" have drawbacks. For one example, error in inputting certain signals, such as barcodes, can result in the incorrect "personality" being activated, resulting in malfunction or error in operation. For another example, physical methods of setting the "personality" are prone to misapplication, errors, or the like.

Accordingly, a user interface assembly for a domestic appliance with improved methods for implementing control features would be beneficial. In particular, a method of initializing and activating a correct operating software for a domestic appliance would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a user interface assembly for a domestic appliance is provided. The user interface assembly may include a control panel including a first panel side and a second panel side opposite the first panel side; a user interface board including a first board side and a second board side opposite the first board side, the first board side facing the second panel side of the control panel; a digital image sensor attached to the user interface board, the digital image sensor being configured to optically view the second panel side of the control panel; and a controller operably coupled with the digital image sensor, the controller being configured to perform an operation. The operation may include directing the digital image sensor to scan at least a portion of the second panel side to capture a digital signal; analyzing the received digital signal to determine a model identification of the control panel; and activating a predetermined operating software for the domestic appliance based on the determined model identification.

In another exemplary aspect of the present disclosure, a method of operating a domestic appliance is provided. The domestic appliance may include a user interface assembly including a control panel, a user interface board, and a digital image sensor attached to the user interface board, the digital image sensor being configured to optically view the control panel. The method may include directing the digital image sensor to scan at least a portion of the control panel to capture a digital signal; analyzing the received digital signal to determine a model identification of the control panel; and activating a predetermined operating software for the domestic appliance based on the determined model identification.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
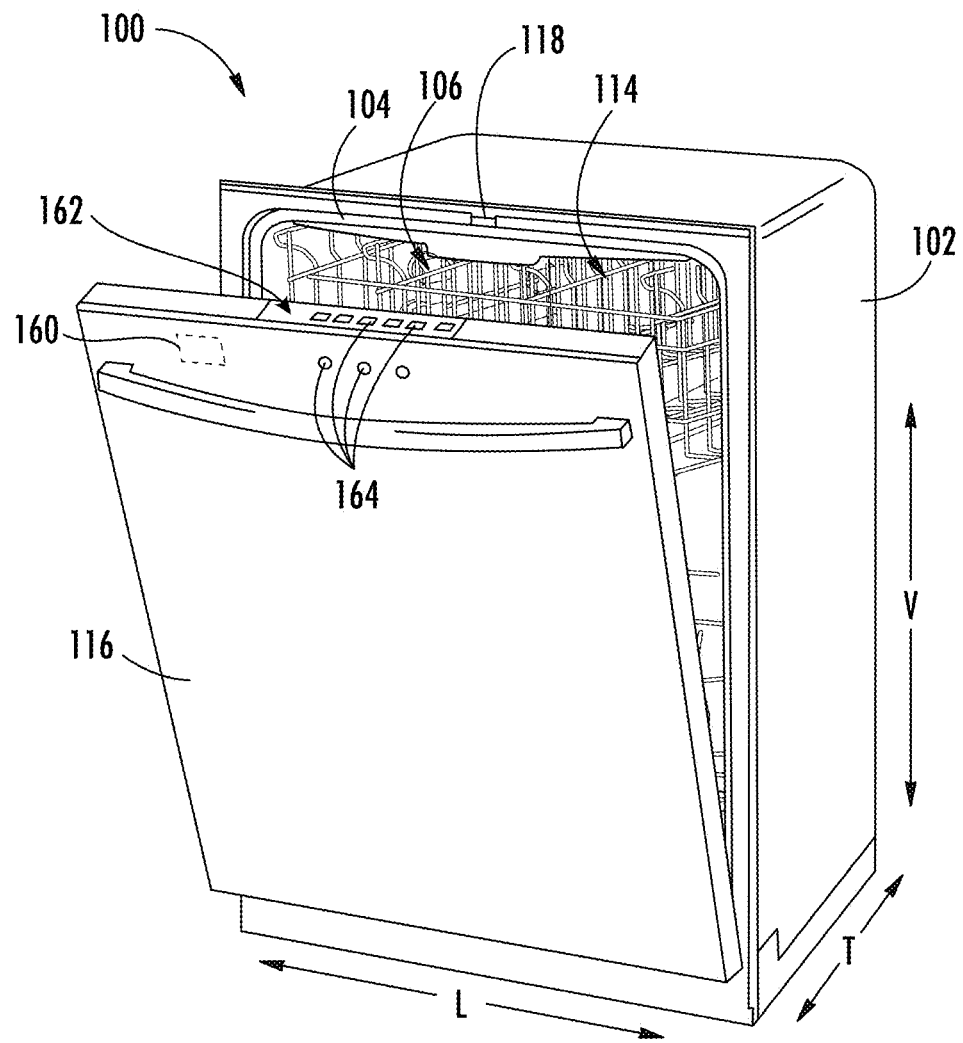
FIG. 1 provides a front perspective view of a dishwasher appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Turning now to the figures, FIG. 1 depicts an exemplary dishwasher or dishwashing appliance (e.g., dishwashing appliance 100) that may be configured in accordance with aspects of the present disclosure. Generally, dishwasher 100 defines a vertical direction V, a lateral direction L, and a transverse direction T. Each of the vertical direction V, lateral direction L, and transverse direction T are mutually perpendicular to one another and form an orthogonal direction system.

Dishwasher 100 may include a cabinet 102 having a tub 104 therein that defines a wash chamber 106. Tub 104 may extend between a top and a bottom along the vertical direction V, between a pair of side walls along the lateral direction L, and between a front side and a rear side along the transverse direction T.

Tub 104 may include a front opening 114. In some embodiments, the dishwasher appliance 100 may also include a door 116 at the front opening 114. The door 116 may, for example, be hinged at its bottom for movement between a normally closed vertical position, wherein the wash chamber 106 is sealed shut for washing operation, and a horizontal open position for loading and unloading of articles from dishwasher 100. A door closure mechanism or assembly 118 may be provided to lock and unlock door 116 for accessing and sealing wash chamber 106.

In certain embodiments, dishwasher 100 includes a controller 160 configured to regulate operation of dishwasher 100 (e.g., initiate one or more wash operations). Controller 160 may include one or more memory devices and one or more microprocessors, such as general or special purpose microprocessors operable to execute programming instructions or micro-control code associated with a wash operation that may include a wash cycle, rinse cycle, or drain cycle. The memory may represent random access memory such as DRAM, or read only memory such as ROM or FLASH. In some embodiments, the processor executes programming instructions stored in memory. The memory may be a separate component from the processor or may be included onboard within the processor. Alternatively, controller 160 may be constructed without using a microprocessor, e.g., using a combination of discrete analog or digital logic circuitry-such as switches, amplifiers, integrators, comparators, flip-flops, AND gates, and the like-to perform control functionality instead of relying upon software. It should be noted that controllers as disclosed herein are capable of and may be operable to perform any methods and associated method steps as disclosed herein.

Controller 160 may be positioned in a variety of locations throughout dishwasher 100. In optional embodiments, controller 160 is located within a control panel area 162 of door 116 (e.g., as shown in FIG. 1). Input/output ("I/O") signals may be routed between the control system and various operational components of dishwasher 100 along wiring harnesses that may be routed through the bottom of door 116. Typically, the controller 160 includes a user interface panel/controls 164 through which a user may select various operational features and modes and monitor progress of dishwasher 100. In some embodiments, user interface 164 includes a general purpose I/O ("GPIO") device or functional block. In additional or alternative embodiments, user interface 164 includes input components, such as one or more of a variety of electrical, mechanical or electromechanical input devices including rotary dials, push buttons, and touch pads. In further additional or alternative embodiments, user interface 164 includes a display component, such as a digital or analog display device designed to provide operational feedback to a user. When assembled, user interface 164 may be in operative communication with the controller 160 via one or more signal lines or shared communication busses.

While described in the context of a specific embodiment of dishwasher appliance 100, it will be understood that dishwasher appliance 100 is provided by way of example only. Other dishwashing appliances having different configurations, different appearances, and/or different features may also be utilized with the present subject matter as well. Additionally or alternatively, it should be noted that the features described herein may be incorporated into any suitable domestic appliance, including but not limited to refrigerator appliances, cooking or oven appliances, microwave appliances, air conditioner appliances, laundry appliances, and the like. Thus, the teachings of the present disclosure are not limited to use with dishwasher appliance 100.

Figure 2:
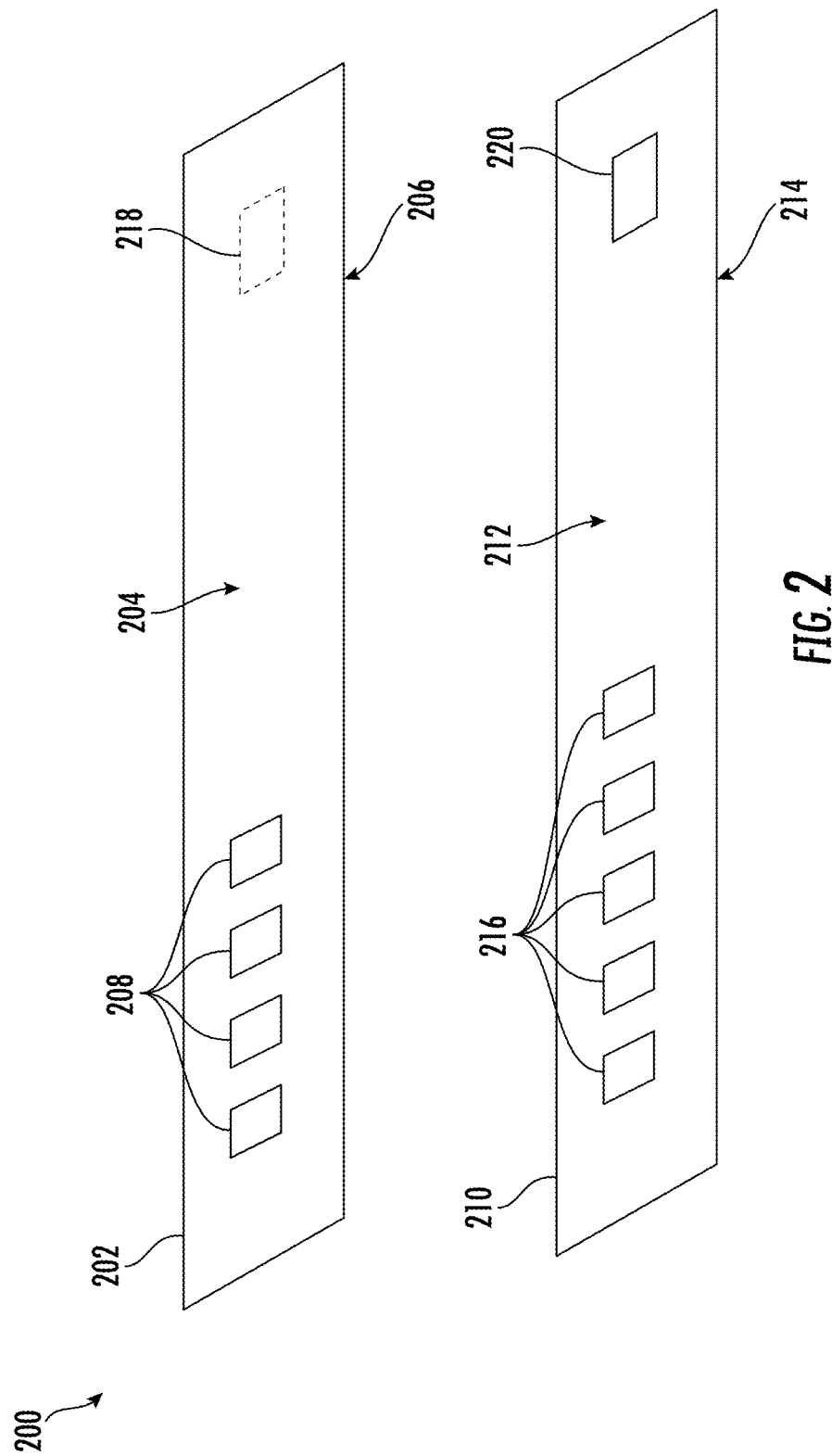
FIG. 2 provides an exploded schematic view of an exemplary user interface assembly of the dishwasher appliance of FIG. 1.

FIG. 2 provides an exploded perspective view of an exemplary user interface assembly 200 according to exemplary embodiments. For instance, user interface assembly 200 may be incorporated into dishwasher appliance 100. Additionally or alternatively, user interface assembly 200 may be incorporated into any suitable domestic appliance as described above. Accordingly, user interface assembly 200 may be configured to receive inputs (e.g., touch inputs) and transmit signals to a controller (e.g., controller 160) to perform a variety of operations within the associated appliance. For the purposes of this disclosure, user interface assembly 200 is described with reference to dishwasher appliance 100.

User interface assembly 200 may include a control panel 202. According to some embodiments, control panel 202 is equivalent to control panel area 162. Control panel 202 may include a first panel side 204 and a second panel side 206 opposite first panel side 204. For instance, according to at least one embodiment, first panel side 204 faces upward (e.g., along the vertical direction V). However, it should be noted that user interface assembly 200 may be oriented in any suitable direction and the disclosure is not limited to the examples provided herein. Accordingly, hereinafter, first panel side 204 may be referred to as facing a longitudinal direction. Additionally or alternatively, control panel 202 may extend within a latitudinal plane, the latitudinal plane being perpendicular with the longitudinal direction. Accordingly, a plurality of latitudinal planes may be defined within user interface assembly 200. First panel side 204 may form a contact portion of control panel 202. For instance, first panel side 204 may be configured to receive inputs (e.g., user inputs) to operate the appliance.

User interface assembly 200 may include one or more touch or input buttons 208 that are positioned along control panel 202 and are operable to detect user inputs on control panel 202. For instance, input buttons 208 may be configured for triggering when a user touches first panel side 204 of control panel 202. In particular, input buttons 208 may include capacitive sensors capable of detecting when a finger or another conductive material with a dielectric difference from air contacts or approaches control panel 202. Thus, when a user touches first panel side 204 of control panel 202 adjacent one of input buttons 208, a sensor (described below) may trigger and, e.g., signal a controller (e.g., controller 180). In such a manner, operations of the appliance may be initiated and controlled. Input buttons 208 may be distributed across control panel 202. It should be understood that other any suitable number, type, and position of input buttons 208 may be incorporated while remaining within the scope of the present subject matter. Furthermore, first panel side 204 of control panel 202 may have any suitable shape or configuration. For example, in an embodiment, control panel 202 may be arcuate (e.g., curved). In alternative embodiments, control panel 202 may be flat.

User interface assembly 200 may include a user interface board 210. For instance, user interface board 210 may be a printed circuit board (PCB). User interface board 210 may be operably (e.g., electrically) connected with control panel 202. Accordingly, inputs to control panel 202 (e.g., at input buttons 208) may be received at user interface board 210. User interface board 210 may include a first board side 212 and a second board side 214. User interface board 210 may be spaced apart from control panel 202 along the longitudinal direction. For instance, first board side 212 may face second panel side 206 (e.g., along the longitudinal direction).

According to some embodiments, user interface board 210 includes a touch sensor 216. For instance, touch sensor 216 may be configured to receive or detect a touch input (e.g., to input button 208). A plurality of distinct touch sensors 216 may be provided along user interface board 210 (e.g., along first board side 212). For instance, each of the plurality of touch sensors 216 may be spaced apart from each other along user interface board 210. Touch sensor 216 may be conductive sensors, such that, as explained above, when a conductive material contacts or approaches touch sensor 216, a trigger may be sent to controller 160.

User interface board 210 may be incorporated into a plurality of different appliances that utilize touch input control panels. For instance, user interface board 210 may be a universal user interface board 210 capable of being installed and programmed to a plurality of different appliances. Accordingly, some appliances may include fewer operable touch inputs 208 than other appliances.

Control panel 202 may be one of a plurality of potential control panels that can be incorporated into different models of an appliance (or different appliances altogether). Control panel 202 may thus include one or more graphics pertaining to select operations of the associated appliances. Each graphic (or a particular graphic cluster) may be associated with a particular number of input buttons 208. For one example, a particular graphic cluster may include or represent four input buttons 208 on first panel side 204 of control panel 202 (e.g., as shown in FIG. 2).

Control panel 202 may include a predetermined code 218. For instance, predetermined code 218 may be applied to second panel side 206 of control panel 202. According to some embodiments, predetermined code 218 is applied to control panel 202 via a printing process. In detail, a high-speed printing process may apply a printing layer to control panel 202 (e.g., second panel side 206). Predetermined code 218 may thus be adhered to control panel 202 through the printing layer. Additionally or alternatively, predetermined code 218 may be applied to second panel side 206 of control panel 202 via a sticker, a decal, an adhesive, or the like. For instance, predetermined code 218 may be printed onto a sticker or decal and then secured, attached, or otherwise connected to control panel 202.

Predetermined code 218 may include a dot matrix code. For instance, each particular control panel of the plurality of potential control panels may include a unique and distinct predetermined code so as to properly identify the particular control panel and associated graphics therewith. Additionally or alternatively, predetermined code 218 may include one or more unique colors or color combinations, one or more designs (e.g., shapes, patterns, etc.), or any combination thereof. Further still, predetermined code 218 may be formed (e.g., molded, shaped, cut, built, etc.) directly into control panel 202. Thus, predetermined code 218 may be formed integrally with control panel 202.

User interface board 210 may include a digital image sensor 220. Digital image sensor 220 may be attached, coupled, assembled, or otherwise fixed to user interface board 210 (e.g., at first board side 212). Digital image sensor 220 may be configured to optically view control panel 202 (e.g., second panel side 206 of control panel 202). For instance, digital image sensor 220 may be configured (e.g., programmed) to detect or obtain one or more signals (e.g., digital signals) from a source (e.g., predetermined code 218). Thus, digital image sensor 220 may receive the identification code or signal from predetermined code 218 (as will be explained further below). Digital image sensor 220 may be positioned adjacent to predetermined code 218 (e.g., when control panel 202 is assembled to user interface board 210). For instance, predetermined code 218 and digital image sensor 220 may face each other as first board side 212 faces second panel side 206. According to some embodiments, a lens may be positioned at or near digital image sensor 220. For instance, the lens may focus photons at various wavelengths before passing through to digital image sensor 220. In some embodiments, the lens is incorporated as part of digital image sensor 220.

Digital image sensor 220 may be operable connected with controller 160. In detail, digital image sensor 220 may exchange signals or communications with controller 160, e.g., relating to the received code or digital signal (e.g., from predetermined code 218). digital image sensor 220 may thus be or include any suitable digital sensor configured to or capable of capturing digital signals (e.g., such as a digital image signal or image) and transmit electronic or digital signals (e.g., to controller 160). Digital image sensor 220 may include a complementary metal-oxide semiconductor (CMOS) sensor, a digital camera, or the like capable of obtaining a capture (e.g., such as a digital image), as would be understood.

Figure 3:
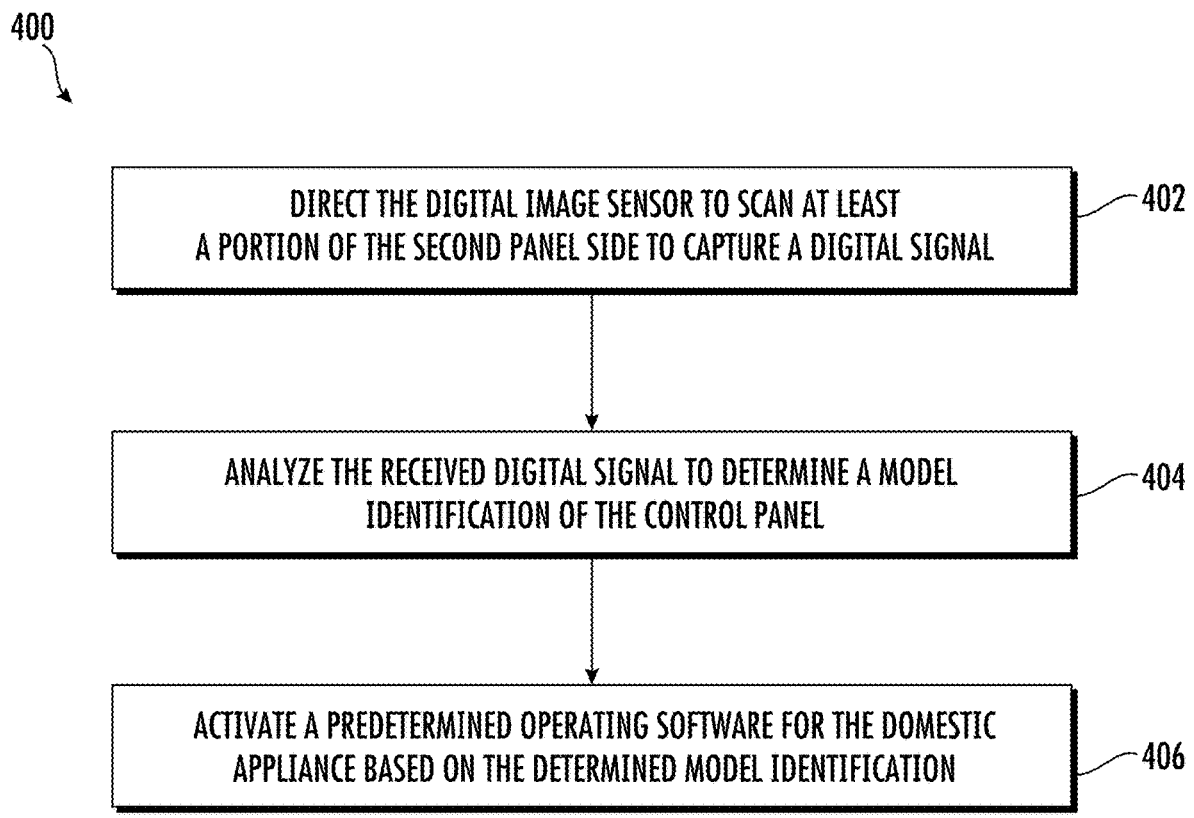
FIG. 3 provides a flow chart illustrating a method of operating a domestic appliance according to exemplary embodiments of the present disclosure.

Now that the general descriptions of an exemplary appliance have been described in detail, a method 400 of operating a domestic appliance (e.g., dishwasher appliance 100) will be described in detail. Although the discussion below refers to the exemplary method 400 of operating dishwasher appliance 100, one skilled in the art will appreciate that the exemplary method 400 is applicable to any suitable domestic appliance including a user interface (e.g., a touch screen or capacitive user interface, etc.). In exemplary embodiments, the various method steps as disclosed herein may be performed by controller 160 and/or a separate, dedicated controller. FIG. 3 provides a flow chart illustrating a method of operating a dishwasher appliance. Hereinafter, method 400 will be described with specific reference to FIG. 3.

At step 402, method 400 may include directing the digital image sensor to scan at least a portion of the second panel side to capture a digital signal. The digital signal may include a capture of at least a portion of a second panel side of a control panel (e.g., control panel 202). In detail, method 400 may determine that a control panel has been attached to a user interface board (e.g., user interface board 210), such as during assembly, after maintenance, or the like. In some instances, the attachment may be determined when power is applied to, e.g., the user interface board.

Upon determining that the control panel is attached to the user interface board (e.g., directly or via one or more additional panels, brackets, pads, etc.), method 400 may include generating an initiation signal to activate the digital image sensor. The initiation signal may be provided via a software flag set within the user interface board. For instance, the software flag may generate the initiation signal and command the digital image sensor to activate upon determining that control panel is within a readable or capturable distance to the digital image sensor. Accordingly, the software flag may determine when the appliance is to receive the signal (e.g., from the digital image sensor). In some instances, the software flag may be set or reset by a service technician (e.g., during maintenance or replacement). Upon receiving the initiation signal, the digital image sensor may be activated to capture or obtain the digital signal or image.

At step 404, method 400 may include analyzing the received signal (e.g., digital signal) to determine a model identification of the control panel. In detail, the received digital signal (e.g., from a predetermined code on the control panel) may be transmitted to a controller, e.g., on board the user interface board. The received signal may then be decoded, interpreted, or otherwise analyzed. The analysis may provide an identification of the attached control panel. According to some embodiments, a plurality of operating systems or instructions are stored within a table (e.g., a lookup table) on the user interface board. Each of the plurality of operating systems or instructions may be associated with a particular digital signal (e.g., relating to the predetermined code, a physical feature, etc.) to provide a positive identification of the attached control panel. For instance, the analysis may determine how many input buttons are present and usable on the attached control panel. Additionally or alternatively, the analysis may include instructions for initializing certain operating procedures within the user interface board.

In additional or alternative embodiments, analyzing the received digital signal includes ascertaining one or more physical features of a second panel side of the control panel. For instance, one or more image processing techniques may be applied (e.g., within the controller) to determine, discover, sense, find, or otherwise ascertain features of the control panel. The features may include colors, ridges, ribs, grooves, notches, or the like. According to exemplary embodiments, this image analysis or processing may use any suitable image processing technique, image recognition process, etc. As used herein, the terms "image analysis" and the like may be used generally to refer to any suitable method of observation, analysis, image decomposition, feature extraction, image classification, etc. of one or more images, videos, or other visual representations of an object. As explained in more detail below, this image analysis may include the implementation of image processing techniques, image recognition techniques, or any suitable combination thereof.

Specifically, the analysis of the received digital signal may include implementation an image processing algorithm. As used herein, the terms "image processing" and the like are generally intended to refer to any suitable methods or algorithms for analyzing images that do not rely on artificial intelligence or machine learning techniques. This image analysis may help identify substantial differences between different features (e.g., physical features) or codes on unique individual control panels. Similarities and/or differences between a reference image and the obtained image (e.g., from the digital signal) may be used to identify features (e.g., of the control panel).

At step 406, method 400 may include activating a predetermined operating software for the domestic appliance based on the determined model identification. As mentioned above, a universal user interface board including a plurality of touch sensors may be incorporated into a plurality of different appliances including different control interfaces or panels. As such, the correct corresponding number of touch sensors should be activated for the number of input buttons (or graphics) on the associated attached control panel. Upon determining the model identification, method 400 may set a "personality" for the appliance. The "personality" may include which touch sensors to be activated or recognized, desired actions by the activated touch sensors, or the like. Additionally or alternatively, the "personality" may include certain lighting features, sounds, or the like to be activated.

Additionally or alternatively, method 400 may include confirming the predetermined operating software. For instance, an input (e.g., an outside input, user input, etc.) may be applied to the user interface board to confirm the correct operating software was initialized and activated. For instance, a barcode may be scanned and input to the controller of the user interface board. Method 400 may compare the scanned barcode to the activated operating software and confirm the correct "personality" was activated.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A user interface assembly for a domestic appliance, the user interface assembly comprising:
   a control panel comprising a first panel side and a second panel side opposite the first panel side;
   a user interface board comprising a first board side and a second board side opposite the first board side, the first board side facing the second panel side of the control panel;
   a digital image sensor attached to the user interface board, the digital image sensor being configured to optically view the second panel side of the control panel; and
   a controller operably coupled with the digital image sensor, the controller being configured to perform an operation, the operation comprising:
      directing the digital image sensor to scan at least a portion of the second panel side to capture a digital signal;
      analyzing the received digital signal to determine a model identification of the control panel; and
      activating a predetermined operating software for the domestic appliance based on the determined model identification.

2. The user interface assembly of claim 1, further comprising:
   a predetermined code applied to the second panel side of the control panel, wherein the predetermined code is captured by the digital image sensor.

3. The user interface assembly of claim 2, wherein the predetermined code is positioned adjacent to the digital image sensor when the user interface board is assembled to the control panel.

4. The user interface assembly of claim 3, wherein analyzing the received digital signal comprises:
   deciphering the predetermined code captured by the digital image sensor.

5. The user interface assembly of claim 1, wherein analyzing the received digital signal comprises:
   ascertaining one or more physical features of the second panel side via image processing.

6. The user interface assembly of claim 1, wherein the control panel comprises a predetermined number of input buttons.

7. The user interface assembly of claim 6, wherein the predetermined number of input buttons comprises a plurality of capacitive touch inputs.

8. The user interface assembly of claim 1, wherein directing the digital image sensor to scan at least a portion of the second panel side comprises:
   determining that the control panel has been attached to the user interface board; and
   generating an initiation signal to activate the digital image sensor.

9. The user interface assembly of claim 8, wherein the initiation signal to activate the digital image sensor is provided via a software flag of the user interface board.

10. The user interface assembly of claim 1, wherein activating the predetermined operating software comprises:
    enabling a predetermined number of inputs on the user interface board, wherein the predetermined number of inputs corresponds to a number of input graphics provided on the first panel side of the control panel.

11. A method of operating a domestic appliance, the domestic appliance comprising a user interface assembly comprising a control panel, a user interface board, and a digital image sensor attached to the user interface board, the digital image sensor being configured to optically view the control panel, the method comprising:
    directing the digital image sensor to scan at least a portion of the control panel to capture a digital signal;
    analyzing the received digital signal to determine a model identification of the control panel; and
    activating a predetermined operating software for the domestic appliance based on the determined model identification.

12. The method of claim 11, further comprising:
    a predetermined code applied to the control panel, wherein the predetermined code is captured by the digital image sensor.

13. The method of claim 12, wherein the predetermined code is positioned adjacent to the digital image sensor when the user interface board is assembled to the control panel.

14. The method of claim 13, wherein analyzing the received digital signal comprises:
    deciphering the predetermined code captured by the digital image sensor.

15. The method of claim 11, wherein analyzing the received digital signal comprises:
    ascertaining one or more physical features of the control panel via image processing.

16. The method of claim 11, wherein the control panel comprises a predetermined number of input buttons.

17. The method of claim 16, wherein the predetermined number of input buttons comprises a plurality of capacitive touch inputs.

18. The method of claim 11, wherein directing the digital image sensor to scan at least a portion of the control panel comprises:
    determining that the control panel has been attached to the user interface board; and
    generating an initiation signal to activate the digital image sensor.

19. The method of claim 18, wherein the initiation signal to activate the digital image sensor is provided via a software flag of the user interface board.

20. The method of claim 11, wherein activating the predetermined operating software comprises:
    enabling a predetermined number of inputs on the user interface board, wherein the predetermined number of inputs corresponds to a number of input graphics provided on the control panel.

* * * * *